(12) United States Patent
Yamada et al.

(10) Patent No.: US 11,667,790 B2
(45) Date of Patent: Jun. 6, 2023

(54) POLYMER HAVING REACTIVE SILICON-CONTAINING GROUP AND PRODUCTION METHOD THEREFOR

(71) Applicant: SHIN-ETSU CHEMICAL CO., LTD., Tokyo (JP)

(72) Inventors: Tetsuro Yamada, Annaka (JP); Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 267 days.

(21) Appl. No.: 17/048,190

(22) PCT Filed: Jan. 22, 2019

(86) PCT No.: PCT/JP2019/001767
§ 371 (c)(1),
(2) Date: Oct. 16, 2020

(87) PCT Pub. No.: WO2019/202796
PCT Pub. Date: Oct. 24, 2019

(65) Prior Publication Data
US 2021/0155800 A1 May 27, 2021

(30) Foreign Application Priority Data
Apr. 17, 2018 (JP) .............................. JP2018-079194

(51) Int. Cl.
| | | |
|---|---|---|
| C08L 83/04 | (2006.01) | |
| C08K 5/17 | (2006.01) | |
| C09D 183/04 | (2006.01) | |
| C09J 183/04 | (2006.01) | |

(52) U.S. Cl.
CPC .............. *C08L 83/04* (2013.01); *C08K 5/17* (2013.01); *C09D 183/04* (2013.01); *C09J 183/04* (2013.01)

(58) Field of Classification Search
CPC ....... C08L 101/10; C08L 33/08; C09J 201/10; C08F 20/10; C09D 133/08
See application file for complete search history.

(56) References Cited

U.S. PATENT DOCUMENTS

| | | | |
|---|---|---|---|
| 6,458,903 B1 | 10/2002 | Nakagawa et al. | |
| 2005/0119421 A1* | 6/2005 | Schindler | C08L 75/04 525/474 |
| 2005/0119436 A1 | 6/2005 | Ziche et al. | |
| 2009/0156774 A1 | 6/2009 | Ziche | |
| 2010/0069551 A1 | 3/2010 | Minge et al. | |
| 2012/0172563 A1* | 7/2012 | Carloff | C08F 220/14 526/325 |

FOREIGN PATENT DOCUMENTS

| | | |
|---|---|---|
| CN | 107805309 A | 3/2018 |
| GB | 1532971 A | 11/1978 |
| JP | 51-57755 A | 5/1976 |
| JP | 2000-72809 A | 3/2000 |
| JP | 2004-99908 A | 4/2004 |
| JP | 2005-514504 A | 5/2005 |
| JP | 2005-154779 A | 6/2005 |
| JP | 2007-534811 A | 11/2007 |
| JP | 2010-510338 A | 4/2010 |
| JP | 2010-168549 A | 8/2010 |
| JP | 2010-202863 A | 9/2010 |
| JP | 2010-209205 A | 9/2010 |

OTHER PUBLICATIONS

Odian (Principles of Polymerization, 4th Ed., Wiley-Interscience, 2004, p. 307).*
International Search Report, issued in PCT/JP2019/001767, PCT/ISA/210, dated May 7, 2019.
Written Opinion of the International Searching Authority, issued in PCT/JP2019/001767, PCT/ISA/237, dated May 7, 2019.

* cited by examiner

*Primary Examiner* — Kuo Liang Peng
(74) *Attorney, Agent, or Firm* — Birch, Stewart, Kolasch & Birch, LLP

(57) ABSTRACT

This polymer having a reactive silicon-containing group is represented by structural formula (1), and has good reactivity while having a monoalkoxysilyl group.

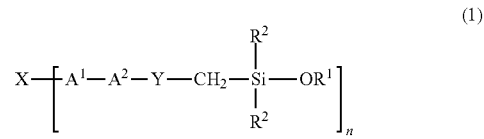

(1)

(In the formula, X represents a monovalent to trivalent organic group including a main chain backbone including a predetermined polymer such as a polyurethane, a poly(meth)acrylate, or a polysiloxane, $R^1$ and $R^2$ each independently represent an alkyl group or the like having 1-10 carbon atoms, Y represents O, S, or the like, $A^1$ and $A^2$ each represent a single bond, or a divalent linking group such as a divalent hydrocarbon group having 1-20 carbon atoms, and n represents a number of 1-3.)

5 Claims, No Drawings

POLYMER HAVING REACTIVE SILICON-CONTAINING GROUP AND PRODUCTION METHOD THEREFOR

TECHNICAL FIELD

This invention relates to a polymer having a reactive silicon-containing group and a method for preparing the same. More particularly, it relates to a polymer containing a silicon-bonded monoalkoxy group at the molecular chain end as a silicon group capable of forming a siloxane bond to achieve a molecular weight buildup (also referred to as "reactive silicon group," hereinafter), and a method for preparing the same.

BACKGROUND ART

Since reactive silicon groups, especially alkoxysilyl groups are capable of hydrolytic condensation in the presence of water, polymers having reactive silicon groups can be used as curable compositions adapted to crosslink and cure in the presence of moisture or humidity. Of such polymers, polymers of polyoxyalkylene backbone are generally known as modified silicones, and polymers of silicon-containing compound backbone are generally known as end-capped silicones.

Curable compositions comprising polymers having reactive silicon groups as typified by the foregoing polymers are characterized by being liquid at room temperature and becoming rubber elastomers upon curing. For utilizing these characteristics, they are widely used as coating agents, adhesives, building sealants and the like.

Nowadays, particularly in the applications of adhesives and building sealants, not only a strong bond is simply required, but an improvement in durability and bond of better quality are also required. For example, when the cured adhesive layer becomes a tough and flexible rubber elastomer which can accommodate the thermal expansion and shrinkage of a substrate and external stresses, there are obtained elastic adhesives which are improved in durability and reliability.

A number of proposals were made on the method for preparing polymers having reactive silicon groups at molecular chain ends. Some have been used for industrial manufacture.

For example, as the compound having a polyoxyalkylene group in the backbone and an alkoxysilyl group at molecular chain end, polymers of polyoxypropylene backbone having methyldimethoxysilyl groups bonded at both molecular chain ends are known. As a typical example of such polymers, room temperature curable compositions comprising an alkoxysilyl-end-capped polyoxyalkylene based compound as the main component or base polymer are known from Patent Documents 1 and 2.

The room temperature curable compositions of Patent Documents 1 and 2, however, have the problem that since crosslinking reaction takes place under the impetus of moisture curing of methyldimethoxysilyl or trimethoxysilyl groups, cured products after moisture curing have a high crosslinking density and are susceptible to cracking or peeling.

On the other hand, when a compound having a dimethylmonomethoxysilyl group is used in combination for the purpose of reducing the crosslinking density, there arises the problem of cure failure because the reactivity of dimethylmonomethoxysilyl group is very low.

PRIOR ART DOCUMENTS

Patent Documents

Patent Document 1: JP-A 2004-099908
Patent Document 2: JP-A 2010-209205

SUMMARY OF INVENTION

Technical Problem

An object of the invention, which has been made under the above-mentioned circumstances, is to provide a polymer containing a monoalkoxysilyl group as the reactive silicon-containing group and yet having a high reactivity, and a method for preparing the same.

Solution to Problem

Making extensive investigations to attain the above object, the inventors have found a specific polymer containing a specific heteroatom-methylene-silyl linkage as a linking group of linking a monoalkoxysilyl group at a molecular chain end to the backbone structure, and a method for preparing the same, and that a composition comprising the polymer has high reactivity and gives a cured product having excellent flexibility and is suited as a curable composition for forming such materials as coating agents, adhesives and sealants.

The invention is predicated on this finding.
The invention is as defined below.
1. A polymer having a reactive silicon-containing group, represented by the structural formula (1):

[Chem. 1]

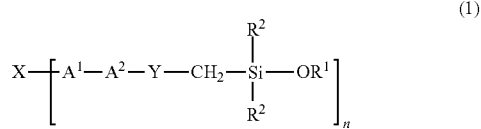

wherein $R^1$ is a substituted or unsubstituted $C_1$-$C_{10}$ alkyl group or substituted or unsubstituted $C_6$-$C_{10}$ aryl group, $R^2$ is each independently a substituted or unsubstituted $C_1$-$C_{10}$ alkyl group or substituted or unsubstituted $C_6$-$C_{10}$ aryl group, n indicative of the valence of X is a number of 1 to 3, X is a mono- to trivalent organic group having a backbone skeleton selected from among polyurethane, polyurea, polycarbonate, polyester, polyamide, polyimide, polyamide-imide, poly(meth)acrylate, polystyrene, polyolefin, polyvinyl ester, polytetrafluoroethylene, polyacetal, polyphenylene ether, polyphenylene sulfide, polysulfone, polyether sulfone, polyether ether ketone, polysiloxane, polysiloxane-polyurethane copolymers and polysiloxane-polyurea copolymers, and copolymers thereof, Y is a single bond, O, S, or $N(R^3)$, $R^3$ is hydrogen, a substituted or unsubstituted $C_1$-$C_{10}$ alkyl group, or substituted or unsubstituted $C_6$-$C_{10}$ aryl group, and when X is di- or trivalent, $R^3$ in two groups $N(R^3)$ may bond together to form a substituted or unsubstituted $C_1$-$C_{10}$ alkylene group or substituted or unsubstituted $C_6$-$C_{20}$ arylene group, $A^1$ and $A^2$ are each independently a single bond, a substituted or unsubstituted $C_1$-$C_{20}$ divalent hydrocarbon group, or a divalent linking group containing a heteroatom, with the proviso that when Y is a single bond, divalent group $A^1$-$A^2$ or X bonds to the Si-bonded $CH_2$ group (excluding $CH_2$ in $R^2$) via a heteroatom.

2. The polymer having a reactive silicon-containing group of 1 wherein X is a divalent organic group having a backbone skeleton selected from among polyurethane, poly(meth)acrylate, polysiloxane, and polysiloxane-polyurethane copolymers.

3. The polymer having a reactive silicon-containing group of 1 or 2 having the structural formula (2):

[Chem. 2]

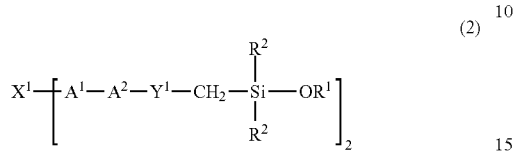
(2)

wherein $R^1$, $R^2$, $A^1$ and $A^2$ are as defined above, $X^1$ is a divalent organic group having a poly(meth)acrylate structure, $Y^1$ is O, S or $N(R^3)$, and $R^3$ is as defined above.

4. The polymer having a reactive silicon-containing group of any one of 1 to 3 having the structural formula (3):

[Chem. 3]

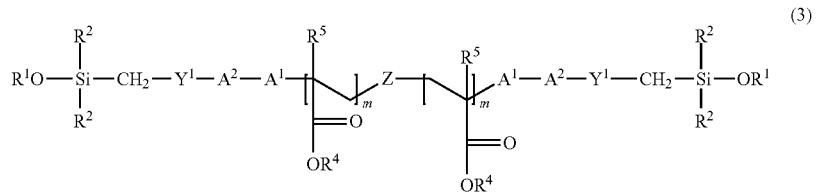
(3)

wherein $R^1$, $R^2$, $A^1$ and $A^2$ are as defined above, $Y^1$ is O, S or $N(R^3)$, $R^4$ is a substituted or unsubstituted $C_1$-$C_{10}$ alkyl group, or substituted or unsubstituted $C_6$-$C_{10}$ aryl group, $R^5$ is hydrogen or methyl, Z is a single bond, substituted or unsubstituted $C_1$-$C_{20}$ alkylene group, substituted or unsubstituted $C_7$-$C_{20}$ aralkylene group, or substituted or unsubstituted $C_6$-$C_{20}$ arylene group, and m is each independently a number of at least 1.

5. A method for preparing the polymer having a reactive silicon-containing group of any one of 1 to 4, comprising the step of reacting a poly(meth)acrylate compound having the average structural formula (4):

[Chem. 4]

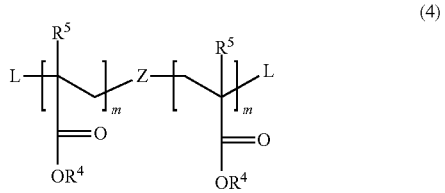
(4)

wherein $R^4$ is a substituted or unsubstituted $C_1$-$C_{10}$ alkyl group, or substituted or unsubstituted $C_6$-$C_{10}$ aryl group, $R^5$ is hydrogen or methyl, Z is a single bond, substituted or unsubstituted $C_1$-$C_{20}$ alkylene group, substituted or unsubstituted $C_7$-$C_{20}$ aralkylene group, or substituted or unsubstituted $C_6$-$C_{20}$ arylene group, m is each independently a number of at least 1, and L is a leaving group selected from among chlorine, bromine, iodine, methansulfonate, trifluoromethanesulfonate, and p-toluenesulfonate, with a compound having the formula (5):

[Chem. 5]

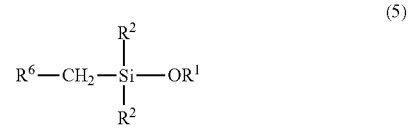
(5)

wherein $R^1$ and $R^2$ are as defined above, $R^6$ is a group containing a functional group capable of reacting with the leaving group.

6. The method of 5 wherein $R^6$ is a group containing a (meth)acryloyloxy, alkenyloxy, mercapto or amino group.

7. A curable composition comprising the polymer having a reactive silicon-containing group of any one of 1 to 4.

8. The curable composition of 7, further comprising a curing catalyst.

9. The curable composition of 8 wherein the curing catalyst is an amine base compound.

10. A coating agent comprising the curable composition of any one of 7 to 9.

11. An adhesive comprising the curable composition of any one of 7 to 9.

12. A cured article obtained by curing the curable composition of any one of 7 to 9.

13. A cured article comprising a coating layer obtained by curing the coating agent of 10.

14. A cured article comprising an adhesive layer obtained by curing the adhesive of 11.

Advantageous Effects of Invention

The polymer having a reactive silicon-containing group of the invention contains a monoalkoxysilyl group and yet has a high reactivity. A composition comprising the polymer gives a cured product having excellent flexibility.

The inventive compound having such properties is advantageously used in such applications as coating agents, adhesives and sealants.

DESCRIPTION OF EMBODIMENTS

Now the invention is described in detail.

The invention provides a polymer having a reactive silicon-containing group, represented by the structural formula (1).

[Chem. 6]

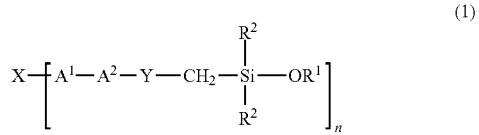

(1)

In formula (1), $R^1$ is a substituted or unsubstituted $C_1$-$C_{10}$, preferably $C_1$-$C_4$ alkyl group or a substituted or unsubstituted $C_6$-$C_{10}$ aryl group. $R^2$ is each independently a substituted or unsubstituted $C_1$-$C_{10}$, preferably $C_1$-$C_4$ alkyl group or a substituted or unsubstituted $C_6$-$C_{10}$ aryl group.

The $C_1$-$C_{10}$ alkyl groups represented by $R^1$ and $R^2$ may be straight, branched or cyclic, and examples thereof include straight or branched alkyl groups such as methyl, ethyl, n-propyl, i-propyl, n-butyl, s-butyl, t-butyl, n-pentyl, neopentyl, n-hexyl, n-heptyl, n-octyl, n-nonyl, and n-decyl, and cycloalkyl groups such as cyclopropyl, cyclobutyl, cyclopentyl, cyclohexyl, cycloheptyl, cyclooctyl, and isobornyl.

Examples of the $C_6$-$C_{10}$ aryl group include phenyl, tolyl, xylyl, α-naphthyl, and β-naphthyl.

In the foregoing groups, some or all of the hydrogen atoms may be substituted by alkyl moieties, aryl moieties, halogen atoms such as F, Cl and Br, or cyano moieties, and examples thereof include 3-chloropropyl, 3,3,3-trifluoropropyl, and 2-cyanoethyl.

Of these, $R^1$ and $R^2$ are preferably selected from methyl, ethyl, and phenyl, with methyl being most preferred from the aspects of reactivity, availability, productivity, and cost.

In formula (1), X is a mono- to trivalent organic group having a polymer backbone skeleton. The polymer backbone skeleton is not particularly limited in structure and may contain a straight, branched or crosslinked structure therein.

Examples of the backbone skeleton of the inventive polymer include polyurethane; polyurea; polycarbonate; polyesters such as polyethylene terephthalate, polytrimethylene terephthalate, polybutylene terephthalate, polyethylene naphthalate, polybutylene naphthalate, amorphous polyallylate and liquid crystal polymers; polyamide; polyimide; polyamide-imide; poly(meth)acrylate; polystyrene; polyolefins such as polyethylene, polypropylene, polyvinyl chloride, cyclic polyolefins, polybutadiene, polyisoprene, polyisobutylene, styrene-butadiene copolymers, polychloroprene, acrylonitrile-butadiene copolymers, acrylonitrile-butadiene-styrene copolymers, isobutylene-isoprene copolymers, ethylene-propylene copolymers, ethylene-propylene-cyclic olefin copolymers; polyvinyl esters such as polyvinyl acetate; polytetrafluoroethylene; polyacetal; polyphenylene ether; polyphenylene sulfide; polysulfone; polyether sulfone; polyether ether ketone; (dimethyl)polysiloxane, (dimethyl)polysiloxane-polyurethane copolymers and (dimethyl)polysiloxane-polyurea copolymers. The backbone may be either of any of the foregoing alone or of a copolymer of two or more of the foregoing.

Of these, the backbone skeleton of the inventive polymer is preferably selected from polyurethane, polyurea, polyester, poly(meth)acrylate, polyolefin, (dimethyl)polysiloxane, (dimethyl)polysiloxane-polyurethane copolymers, and (dimethyl)polysiloxane-polyurea copolymers. From the aspects of reactivity, availability, productivity and cost, polyurethane, poly(meth)acrylate, (dimethyl)polysiloxane, and (dimethyl)polysiloxane-polyurethane copolymers are more preferred, with poly(meth)acrylate being most preferred.

In formula (1), Y is a single bond, —O—, —S—, or —N($R^3$)—.

$R^3$ is hydrogen, a substituted or unsubstituted $C_1$-$C_{10}$, preferably $C_1$-$C_6$ alkyl group, or a substituted or unsubstituted $C_6$-$C_{10}$, preferably $C_6$ aryl group. When X is di- or trivalent, $R^3$ in two groups N($R^3$) may bond together to form a substituted or unsubstituted $C_1$-$C_{10}$ alkylene group or substituted or unsubstituted $C_6$-$C_{20}$ arylene group.

Examples of the alkyl group or aryl group $R^3$ are as exemplified above for $R^1$ and $R^2$.

Examples of the $C_1$-$C_{10}$ alkylene group formed by bonding of $R^3$ together include straight or branched alkylene groups such as methylene, ethylene, trimethylene, propylene, tetramethylene, isobutylene, dimethylethylene, pentamethylene, 2,2-dimethyltrimethylene, hexamethylene, heptamethylene, octamethylene, nonamethylene, and decylene (decamethylene), and cycloalkylene groups such as cyclopentylene and cyclohexylene. Examples of the $C_6$-$C_{20}$ arylene group formed by bonding of $R^3$ together include 1,2-phenylene, 1,3-phenylene, 1,4-phenylene, oxybisphenylene, sulfonebisphenylene, toluenediyl, xylenediyl, and naphthalenediyl.

In these groups, some or all of the hydrogen atoms may be substituted by alkyl moieties, aryl moieties, halogen atoms such as F, Cl and Br, or cyano moieties, and examples thereof include 3-chlorotrimethylene, 2,3,3-trifluorotrimethylene, and 2-chloro-1,4-phenylene.

Particularly when groups $R^3$ bond together to form a ring, each $R^3$ is preferably methylene or ethylene (that is, the alkylene group resulting from bonding of $R^3$ together is ethylene, trimethylene or tetramethylene), with methylene (ethylene as the alkylene group) being more preferred from the aspects of reactivity, availability, productivity and cost.

In formula (1), $A^1$ and $A^2$ each are a single bond, a substituted or unsubstituted $C_1$-$C_{20}$, preferably $C_1$-$C_8$ divalent hydrocarbon group, or a divalent linking group containing a heteroatom.

Examples of the $C_1$-$C_{20}$ divalent hydrocarbon group represented by $A^1$ and $A^2$ include alkylene groups such as methylene, ethylene, trimethylene, propylene, isopropylene, tetramethylene, isobutylene, pentamethylene, hexamethylene, heptamethylene, octamethylene, nonamethylene, decamethylene, undecamethylene, dodecamethylene, tridecamethylene, tetradecamethylene, pentadecamethylene, hexadecamethylene, heptadecamethylene, octadecamethylene, nonadecamethylene, and eicosadecylene; cycloalkylene groups such as cyclopentylene and cyclohexylene; and arylene groups such as phenylene, α- and β-naphthylene.

In the foregoing groups, some or all of the hydrogen atoms may be substituted by alkyl moieties, aryl moieties, halogen atoms such as F, Cl, Br and I, or cyano moieties, and examples thereof include 2-chloroethylene, 2-bromoethylene, 2-chloropropylene, 2-bromopropylene, 1-chloromethylethylene, 1-bromomethylethylene, 2-chlorooctamethylene, 2-bromooctamethylene, 1-chloromethylheptamethylene, and 1-bromomethylheptamethylene.

Of these, a single bond, methylene, ethylene, trimethylene, isopropylene, octamethylene, 2-bromoethylene, 2-bromopropylene, 1-bromomethylethylene, 2-bromooctamethylene, and 1-bromomethylheptamethylene are preferred. A single bond, ethylene, trimethylene, isopropylene, 2-bromoethylene, and 2-bromopropylene are more preferred. A single bond, ethylene, isopropylene, and 2-bromoethylene are even more preferred.

Examples of the heteroatom-containing divalent linking group represented by $A^1$ and $A^2$ include an ether bond (—O—), thioether bond (—S—), amino bond (—NH— or —N($R^3$)— wherein $R^3$ is as defined above), sulfonyl bond (—S($\equiv$O)$_2$—), phosphinyl bond (—P($\equiv$O)OH—), oxo bond (—C($\equiv$O)—), thiooxo bond (—C($\equiv$S)—), ester bond (—C($\equiv$O)O—), thioester bond (—C($\equiv$O)S—), thionoester bond (—C($\equiv$S)O—), dithioester bond (—C($\equiv$S)S—), carbonate bond (—OC($\equiv$O)O—), thiocarbonate bond (—OC($\equiv$S)O—), amide bond (—C($\equiv$O)NH—), thioamide bond (—C($\equiv$S)NH—), urethane bond (—OC($\equiv$O)NH—), thiourethane bond (—SC($\equiv$O)NH—), thionourethane bond (—OC($\equiv$S)NH—), dithiourethane bond (—SC($\equiv$S)NH—), urea bond (—NHC($\equiv$O)NH—), thiourea bond (—NHC($\equiv$S)NH—), and piperazine ring (1,4-piperazinediyl).

Of these, $A^1$ and $A^2$ are preferably a single bond, amino bond (—NH—, —N($R^3$)—), piperazine ring (1,4-piperazinediyl) or oxo bond (—C($\equiv$O)—).

It is noted that a combination to form a consecutive oxygen structure: —O—O— is excluded from the divalent group formed by $A^1$-$A^2$-Y. When Y is a single bond, divalent group $A^1$-$A^2$ or X bonds to the Si-bonded CH$_2$ group (excluding CH$_2$ group in $R^2$) via a heteroatom.

The subscript n is indicative of the valence of the polymer backbone skeleton-containing organic group X, that is, an average number of hydrolyzable groups per molecule of the polymer.

The average number (n) per molecule is 1 to 3, preferably 2 to 3, more preferably 2. If n is less than 1, a polymer is less reactive because of shortage of hydrolyzable groups, so that a composition comprising the same is less curable or a cured product thereof has insufficient mechanical properties.

On the other hand, if n is more than 3, there are more reaction sites and the crosslinking density becomes too high, so that a composition comprising the organosilicon compound becomes poor in shelf stability and a cured product thereof is susceptible to cracking or may fail to exhibit satisfactory mechanical properties.

Accordingly, the organosilicon compound of the invention is preferably one having the following structural formula (2). On use of such organosilicon compound, the resulting composition has better shelf stability and the cured product has better mechanical properties.

[Chem. 7]

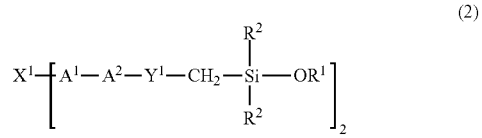

In formula (2), $R^1$, $R^2$, $A^1$ and $A^2$ are as defined above. $X^1$ is a divalent organic group having a poly(meth)acrylate structure, $Y^1$ is O, S or N($R^3$), and $R^3$ is as defined above.

$X^1$ is a divalent organic group containing poly(meth)acrylate structure. The divalent organic group is not particularly limited in structure as long as it contains a poly(meth)acrylate structure. Likewise, the divalent organic group may contain a straight, branched or crosslinked structure in the backbone skeleton.

Also the divalent organic group may contain an ester, carboxyl, hydroxyl, (cyclo)alkyl, alkenyl, aryl, alkylene, arylene, epoxy, amino, cationic, anionic or alkoxysilyl group in side chain structure.

Among others, it is preferred from the aspects of the viscosity of the polymer and the workability of a composition comprising the same that $X^1$ have a poly(meth)acrylate structure which is linear.

It is also preferred from the aspects of the viscosity of the polymer and the shelf stability and workability of a composition comprising the same that the side chain structure be an ester or alkoxysilyl group, more preferably an ester group.

That is, the polymer of the invention is more preferably one having the average structural formula (3). On use of such polymer, the resulting composition has further better shelf stability and the cured product has further better mechanical properties.

[Chem. 8]

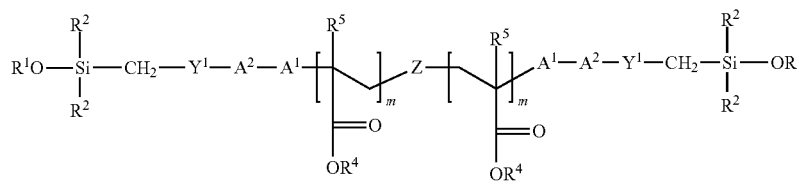

In formula (3), $R^1$, $R^2$, $A^1$, $A^2$ and $Y^1$ are each independently as defined above.

$R^4$ is each independently a substituted or unsubstituted $C_1$-$C_{10}$, preferably $C_1$-$C_6$ alkyl group or a substituted or unsubstituted $C_6$-$C_{10}$ aryl group.

Examples of $R^4$ are as exemplified above for $R^1$ and $R^2$. Inter alia, $R^4$ is preferably methyl, ethyl, or n-butyl, with ethyl or n-butyl being more preferred from the aspects of reactivity, availability, productivity and cost, and viscosity of the polymer.

$R^5$ is each independently hydrogen or methyl, preferably hydrogen.

Herein, the backbone skeleton having poly(meth)acrylate structure may consist of repeating units of one type wherein $R^4$ and $R^5$ are identical or be a copolymer consisting of repeating units of more than one type wherein $R^4$ and $R^5$ are different.

One use in such materials as coating agents, adhesives and sealants, the polymer is preferably a homopolymer wherein $R^5$ is hydrogen and $R^4$ is n-butyl or a copolymer wherein $R^4$ is ethyl and n-butyl, as viewed from durability.

In formula (3), m is each independently a number of at least 1. From the aspects of workability of a composition and mechanical properties of a cured product, m is preferably a number of 1 to 5,000, more preferably 5 to 100.

Z is a single bond, substituted or unsubstituted $C_1$-$C_{20}$ alkylene group, substituted or unsubstituted $C_7$-$C_{20}$, preferably $C_{10}$ aralkylene group, or substituted or unsubstituted $C_6$-$C_{20}$ arylene group. Inter alia, Z is preferably a single bond or a $C_{10}$ aralkylene group as represented by the formula (i).

[Chem. 9]

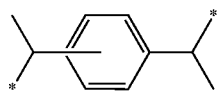

(i)

Herein * designates a valence bond.

Although the number average molecular weight (Mn) of the inventive polymer is not particularly limited, it is preferred for adjusting the viscosity of a curable composition comprising the polymer to an appropriate range for facilitating workability and imparting sufficient curability that the Mn be in the range of 500 to 1,000,000, more preferably 1,000 to 100,000, even more preferably 2,000 to 50,000. It is noted that the Mn is measured by gel permeation chromatography (GPC) using THF solvent versus polystyrene standards (the same holds true, hereinafter).

The polymer of the invention may be prepared by reacting a poly(meth)acrylate compound having a leaving group, represented by the average structural formula (4) below, with a compound having a functional group capable of reacting with the leaving group and a monoalkoxysilyl group (referred to as "monoalkoxysilane," hereinafter), represented by the formula (5).

[Chem. 10]

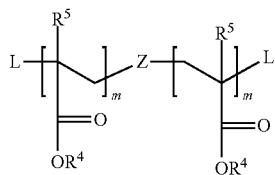

(4)

Herein $R^4$, $R^5$, m and Z are as defined above. L is a leaving group selected from among chlorine, bromine, iodine, methansulfonate, trifluoromethanesulfonate, and p-toluenesulfonate.

[Chem. 11]

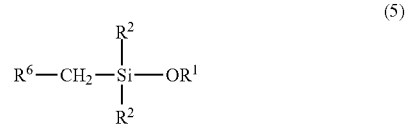

(5)

Herein $R^1$ and $R^2$ are as defined above. $R^6$ is a group containing a functional group capable of reacting with the leaving group.

In formula (4), L is a leaving group, which is specifically chlorine, bromine, iodine, methansulfonate, trifluoromethanesulfonate, or p-toluenesulfonate group.

Of these, L is preferably chlorine, bromine, or iodine, more preferably bromine, from the aspects of the reactivity of the poly(meth)acrylate compound having a leaving group with the monoalkoxysilane, availability, productivity and cost.

Examples of the poly(meth)acrylate compound having a leaving group, represented by the formula (4), include those of the structural formulae shown below, but are not limited thereto.

[Chem. 12]

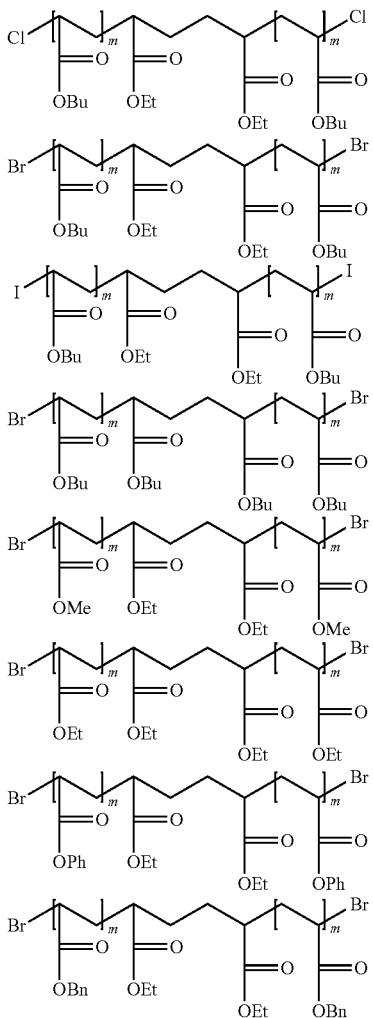

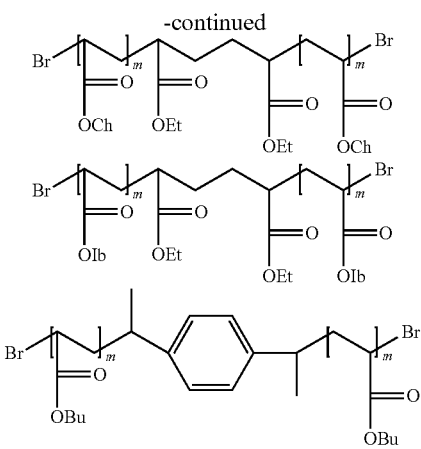

Herein Me stands for methyl, Et for ethyl, Bu for n-butyl, Ph for phenyl, Bn for benzyl, Ch for cyclohexyl, and Ib for isobornyl, and m is as defined above.

As the poly(meth)acrylate compound having a leaving group, represented by formula (4), there may be used any commercially available compounds, or any compounds prepared from a raw material, (meth)acrylate monomer by radical polymerization or atom transfer radical polymerization.

It is not critical how to prepare the poly(meth)acrylate compound having a leaving group, represented by formula (4). Any of well-known methods as described, for example, in JP-A 2000-072809 may be used.

In formula (5), $R^6$ is a group containing a functional group capable of reacting with the leaving group. While the functional group is not particularly limited in structure as long as it is capable of reacting with the leaving group, it is specifically selected from (meth)acryloyloxy, alkenyloxy, mercapto, amino, hydroxyl, carboxyl, phenol, and phosphonate groups, with (meth)acryloyloxy, alkenyloxy, mercapto and amino groups being preferred.

Examples of monoalkoxysilane having formula (5) include acryloyloxymethyldimethylmethoxysilane, acryloyloxymethyldimethylethoxysilane, methacryloyloxymethyldimethylmethoxysilane, methacryloyloxymethyldimethylethoxysilane, vinyloxymethyldimethylmethoxysilane, vinyloxymethyldimethylethoxysilane, allyloxymethyldimethylmethoxysilane, allyloxymethyldimethylethoxysilane, hexenyloxymethyldimethylmethoxysilane, hexenyloxymethyldimethylethoxysilane, octenyloxymethyldimethylmethoxysilane, octenyloxymethyldimethylethoxysilane, undecenyloxymethyldimethylmethoxysilane, undecenyloxymethyldimethylethoxysilane, mercaptomethyldimethylmethoxysilane, mercaptomethyldimethylethoxysilane, N-methylaminomethyldimethylmethoxysilane, N-methylaminomethyldimethylethoxysilane, N-ethylaminomethyldimethylmethoxysilane, N-ethylaminomethyldimethylethoxysilane, N-propylaminomethyldimethylmethoxysilane, N-propylaminomethyldimethylethoxysilane, N-butylaminomethyldimethylmethoxysilane, N-butylaminomethyldimethylethoxysilane, N-hexylaminomethyldimethylmethoxysilane, N-hexylaminomethyldimethylethoxysilane, N-octylaminomethyldimethylmethoxysilane, N-octylaminomethyldimethylethoxysilane, N-phenylaminomethyldimethylmethoxysilane, N-phenylaminomethyldimethylethoxysilane, N-(dimethylmethoxysilylmethyl)piperazine, N-(dimethylethoxysilylmethyl)piperazine, N-(dimethylmethoxysilylmethyl)imidazolidine, N-(dimethylethoxysilylmethyl)imidazolidine, N,N'-dimethyl-N-(dimethylmethoxysilylmethyl)ethylenediamine, N,N'-dimethyl-N-(dimethylethoxysilylmethyl)ethylenediamine, N,N'-di-t-butyl-N-(dimethylmethoxysilylmethyl)ethylenediamine, N,N'-di-t-butyl-N-(dimethylethoxysilylmethyl)ethylenediamine, N,N'-diphenyl-N-(dimethylmethoxysilylmethyl)ethylenediamine, and N,N'-diphenyl-N-(dimethylethoxysilylmethyl)ethylenediamine.

Of these, acryloyloxymethyldimethylmethoxysilane, methacryloyloxymethyldimethylmethoxysilane, allyloxymethyldimethylmethoxysilane, octenyloxymethyldimethylmethoxysilane, mercaptomethyldimethylmethoxysilane, N-butylaminomethyldimethylmethoxysilane, N-octylaminomethyldimethylmethoxysilane, N-phenylaminomethyldimethylmethoxysilane, and N-(dimethylmethoxysilylmethyl)piperazine are preferred from the aspect of hydrolysis.

Inter alia, acryloyloxymethyldimethylmethoxysilane, methacryloyloxymethyldimethylmethoxysilane, mercaptomethyldimethylmethoxysilane, N-butyl aminomethyldimethylmethoxysilane, N-phenylaminomethyldimethylmethoxysilane, and N-(dimethylmethoxysilylmethyl)piperazine are more preferred.

The method for reacting the poly(meth)acrylate compound having a leaving group, represented by formula (4), with the monoalkoxysilane having formula (5) is not particularly limited, and a choice may generally be made among well-known methods commonly used in the reactions with the leaving group.

Specifically, when the monoalkoxysilane has an organic functional group containing active hydrogen, i.e., a mercapto, amino, hydroxyl, carboxyl, phenol or phosphonate group, nucleophilic substitution reaction (desalting reaction) with the leaving group may be performed according to the prior art well-known preparation methods. When the monoalkoxysilane has an organic functional group containing a polymerizable functional group, i.e., (meth)acryloyloxy or alkenyloxy group, radical addition reaction with the leaving group may be performed according to the prior art well-known preparation methods.

Although the reaction proportion of the poly(meth)acrylate compound having a leaving group, represented by formula (4), and the monoalkoxysilane having formula (5) is not particularly limited, it is preferred from the aspects of reducing unreacted reactants and enhancing the shelf stability and other properties of the resulting polymer to adjust the reaction proportion such that that the monoalkoxysilane having formula (5) gives 0.1 to 2.0 moles, more preferably 0.4 to 1.5 moles, even more preferably 0.8 to 1.2 moles of organic functional groups per mole of the leaving group on the compound having formula (4).

When the monoalkoxysilane has an organic functional group containing active hydrogen, i.e., a mercapto, amino, hydroxyl, carboxyl, phenol or phosphonate group, nucleophilic substitution reaction (desalting reaction) with the leaving group is performed. Although there is no need to use a basic compound during the nucleophilic substitution reaction, a basic compound may be used for accelerating the reaction rate.

The basic compound used herein is not particularly limited, and a choice may be made from various basic compounds commonly used in nucleophilic substitution reaction.

Any of various basic compounds commonly used in nucleophilic substitution reaction may be used as long as it is reactive with nothing but active hydrogen in the organic functional group on the monoalkoxysilane having formula (5).

Examples include alkali metals such as metallic sodium and metallic lithium; alkaline earth metals such as metallic calcium; alkali metal hydrides such as sodium hydride, lithium hydride, potassium hydride and cesium hydride; alkaline earth metal hydrides such as calcium hydride; alkali and alkaline earth metal alkoxides such as sodium methoxide, sodium ethoxide, potassium tert-butoxide, and sodium tert-butoxide; alkali and alkaline earth metal carbonates such as potassium carbonate, sodium carbonate and calcium carbonate; alkali and alkaline earth metal hydrogencarbonates such as sodium hydrogencarbonate and potassium hydrogencarbonate; tertiary amines such as triethylamine, tributylamine, N,N-diisopropylethylamine, tetramethylethylenediamine, triethylenediamine, pyridine, and N,N-dimethyl-4-aminopyridine; and amidines such as diazabicycloundecene and diazabicyclononene.

Of these, preferred from the aspect of reaction efficiency are alkali metal hydrides such as sodium hydride, alkali and alkaline earth metal alkoxides such as sodium methoxide, sodium ethoxide, potassium tert-butoxide, tertiary amines such as triethylamine and tributylamine, and amidines such as diazabicycloundecene. Most preferred are sodium methoxide, potassium tert-butoxide, triethylamine and diazabicycloundecene.

Although the amount of the basic compound used is not particularly limited, it is preferred from the aspects of driving the nucleophilic substitution reaction fully forward to prevent some reactants from being left behind, preventing the basic compound from being left in excess, and enhancing the shelf stability and other properties of the resulting polymer to use 0.5 to 10 moles, more preferably 0.8 to 2 moles, even more preferably 0.9 to 1.2 moles of the basic compound per mole of leaving group on the compound having formula (4).

In the nucleophilic substitution reaction, a solvent which is inert to the reactants may be used.

Examples include alcohol solvents such as methanol, ethanol, propanol, isopropanol and butanol; hydrocarbon solvents such as pentane, hexane, heptane, octane, decane, and cyclohexane; aromatic solvents such as benzene, toluene, and xylene; amide solvents such as formamide, N,N-dimethylformamide, pyrrolidone, and N-methylpyrrolidone; ether solvents such as diethyl ether, dibutyl ether, cyclopentyl methyl ether, tetrahydrofuran, and 1,4-dioxane; and nitrile solvents such as acetonitrile, which may be used alone or in admixture of two or more.

Of these, methanol, ethanol, toluene, xylene, dimethylforamide, cyclopentyl methyl ether, tetrahydrofuran and acetonitrile are preferred from the aspect of reaction efficiency.

The temperature during the nucleophilic substitution reaction is preferably 25 to 150° C., more preferably 40 to 120° C., even more preferably 60 to 100° C. from the aspects of providing an adequate reaction rate and suppressing volatilization of the monoalkoxysilane having formula (5), though not particularly limited.

Although the nucleophilic substitution reaction is typically performed under atmospheric pressure, the reaction may be performed under pressure for the purposes of suppressing volatilization of the monoalkoxysilane and accelerating the reaction rate.

The reaction time is typically 10 minutes to 100 hours, though not particularly limited.

It is noted that a catalyst may be used in the nucleophilic substitution reaction for accelerating the reaction rate.

Any suitable catalyst which is non-reactive with the reactants may be selected from various catalysts commonly used in nucleophilic substitution reaction.

Examples include crown ethers such as 12-crown-4, 15-crown-5, 18-crown-6, and dibenzo-18-crown-6; quaternary ammonium salts such as tetrabutylammonium chloride, tetrabutylammonium bromide, tetrabutylammonium iodide, and tetrabutylammonium hydrogensulfate; and alkali metal halides such as potassium iodide and sodium iodide, which may be used alone or in admixture of two or more.

Of these, preferred from the aspects of reactivity and availability are 18-crown-6, tetrabutylammonium bromide, tetrabutylammonium iodide, tetrabutylammonium hydrogensulfate, and potassium iodide. Inter alia, tetrabutylammonium iodide, tetrabutylammonium hydrogensulfate, and potassium iodide are more preferred, with tetrabutylammonium hydrogensulfate being most preferred.

The catalyst acts as a phase transfer catalyst or activates the leaving group to accelerate the reaction rate.

The catalyst may be used in a catalytic amount, preferably in an amount of 0.001 to 10% by weight, more preferably 0.01 to 1% by weight based on the total of the poly(meth)acrylate compound having a leaving group, represented by formula (4), and the monoalkoxysilane having formula (5).

When the monoalkoxysilane has an organic functional group containing a polymerizable functional group, i.e., a (meth)acryloyloxy or alkenyloxy group, radical addition reaction with the leaving group is performed.

Although there is no need to use a catalyst during the radical addition reaction, a catalyst may be used for accelerating the reaction rate.

Although the catalyst used herein is not particularly limited, a choice may be made among those commonly used in radical addition reaction. Preferred are radical polymerization initiators capable of generating radicals in response to heat or light or through redox reaction.

Examples of the radical polymerization initiator include aqueous hydrogen peroxide, organic peroxides such as tert-butyl hydroperoxide, di-tert-butyl peroxide, (2-ethylhexanoyl)(tert-butyl)peroxide, benzoyl peroxide, cumene hydroperoxide, and dicumyl peroxide; azo compounds such as 2,2'-azobispropane, 2,2'-azobisisobutane, 2,2'-azobisisobutyronitrile, 2,2'-azobis-2-methylbutyronitrile, 2,2'-azobis-2-methylvaleronitrile, 2,2'-azobis-2,4-dimethylvaleronitrile, methyl 2,2'-azobis-2-methylpropionate, 2,2'-dichloro-2,2'-azobispropane, 2,2'-dichloro-2,2'-azobisbutane, 1,1'-azo(methylethyl) diacetate, 2,2'-azobisisobutylamide, dimethyl 2,2'-azobisisobutyrate, 3,5-dihydroxymethylphenylazo-2-methylmalonodinitrile, and dimethyl 4,4'-azobis-4-cyanovalerate; redox initiators such as hydrogen peroxide-iron(II) salt, cerium(IV) salt-alcohol, and organic peroxide-dimethylaniline; photopolymerization initiators such as 2-benzyl-2-dimethylamino-1-(4-morpholinophenyl)-1-butanone, 2-methyl-1-[4-(methylthio)phenyl]-2-morpholinopropan-1-one, 2-dimethylamino-2-(4-methylbenzyl)-1-(4-morpholin-4-ylphenyl)butan-1-one, 1-hydroxycyclohexyl phenyl ketone, 2-hydroxy-2-methyl-1-phenylpropan-1-one, 2,2-dimethoxy-1,2-diphenylethan-1-one, 1-[4-(2-hydroxyethoxy)-phenyl]-2-hydroxy-2-methyl-1-propan-1-one, 2-hydroxy-1-[4-{4-(2-hydroxy-2-methylpropionyl)benzyl}phenyl]-2-methylpropan-1-one, 2,4,6-trimethylbenzoyldiphenylphosphine oxide, bis(2,4,6-trimethylbenzoyl)phenylphosphine oxide, bis(2,6-dimethoxybenzoyl)-2,4,4-trimethylpentylphosphine oxide; and dialkyl disulfides such as tetraalkylthiuram disulfides, which may be used alone or in admixture of two or more.

Of these, (2-ethylhexanoyl)(tert-butyl)peroxide and 2,2'-azobis-2-methylbutyronitrile are preferred from the aspect of the reaction rate of radical addition reaction, with 2,2'-azobis-2-methylbutyronitrile being most preferred.

The catalyst may be used in a catalytic amount, typically in an amount of 0.001 to 10% by weight based on the total of the poly(meth)acrylate compound having a leaving group, represented by formula (4) and the monoalkoxysilane having formula (5).

Although the radical addition reaction takes place in a solventless system, a solvent having no detrimental impact on the reaction may be used.

Examples include hydrocarbon solvents such as pentane, hexane, heptane, octane, decane and cyclohexane; aromatic solvents such as benzene, toluene and xylene; amide solvents such as formamide, N,N-dimethylformamide, pyrrolidone, and N-methylpyrrolidone; ester solvents such as ethyl acetate, butyl acetate, γ-butyrolactone, and propylene glycol 1-monomethyl ether 2-acetate; and nitrile solvents such as acetonitrile, which may be used alone or in admixture of two or more.

The temperature during the radical addition reaction is preferably 25 to 150° C., more preferably 40 to 100° C. from the aspects of providing an adequate reaction rate and controlling side reactions, though not particularly limited.

The reaction time is typically 10 minutes to 24 hours, though not particularly limited.

The invention further provides a curable composition, coating composition, and adhesive composition (collectively referred to as composition, hereinafter) comprising (A) the polymer having a reactive silicon-containing group defined above and (B) a curing catalyst.

The polymer as component (A) has a specific structure, which ensures that when a cured article is obtained through coating or bonding treatment with a composition comprising the polymer, the polymer provides a cured product with better curability and flexibility than prior art compositions.

The curing catalyst (B) used in the composition is a component for promoting hydrolytic condensation reaction of hydrolyzable groups on the polymer having a reactive silicon-containing group (A) with airborne moisture or dealcoholization reaction of the organosilicon compound with silanol groups, and helping the composition cure, and added for efficient curing.

The curing catalyst is not particularly limited as long as it is used in the curing of conventional moisture condensation curable compositions. Examples include alkyl tin compounds such as dibutyltin oxide and dioctyltin oxide; alkyl tin ester compounds such as dibutyltin di acetate, dibutyltin dilaurate, dioctyltin dilaurate, dibutyltin dioctoate, dioctyltin dioctoate, and dioctyltin diversatate; titanates, titanium chelate compounds and partial hydrolyzates thereof such as tetraisopropoxytitanium, tetra-n-butoxytitanium, tetrakis(2-ethylhexoxy)titanium, dipropoxybis(acetylacetonato)titanium, titanium diisopropoxybis(ethylacetoacetate), and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, aluminum trihydroxide, aluminum alcoholate, aluminum acylate, aluminum acylate salts, aluminosiloxy compounds, and aluminum chelates; aminoalkyl-substituted alkoxysilanes such as 3-aminopropyltrimethoxysilane, 3-aminopropyltriethoxysilane, 3-aminopropylmethyldimethoxysilane, 3-aminopropylmethyldiethoxysilane, N-β-(aminoethyl)-γ-aminopropylt-rimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, bis[3-(trimethoxysilyl)propyl]amine, bis[3-(triethoxysilyl)propyl]amine, N,N'-bis[3-(trimethoxysilyl)propyl]ethane-1,2-diamine, N,N'-bis[3-(triethoxysilyl)propyl]ethane-1,2-diamine, and N-phenyl-3-aminopropyltrimethoxysilane; amine compounds and salts thereof such as hexylamine, dodecylamine phosphate and tetramethylguanidine; quaternary ammonium salts such as benzyltriethylammonium acetate; alkali metal salts of lower fatty acids such as potassium acetate, sodium acetate, and lithium oxalate; dialkylhydroxylamines such as dimethylhydroxylamine and diethylhydroxylamine; silanes and siloxanes having a guanidyl group such as tetramethylguanidylpropyltrimethoxysilane, tetramethylguanidylpropylmethyldimethoxysilane, tetramethylguanidylpropyltriethoxysilane, tetramethylguanidylpropylmethyldiethoxysilane, and tetramethylguanidylpropyltris(trimethylsiloxy)silane; and phosphazene base-containing silanes and siloxanes such as N,N,N',N',N'',N''-hexamethyl-N'''-[3-(trimethoxysilyl)propyl]-phosphorimidic triamide, which may be used alone or in admixture.

Of these, preference is given to dioctyltin dilaurate, dioctyltin diversatate, tetraisopropoxytitanium, tetra-n-butoxytitanium, titanium diisopropoxybis(ethylacetoacetate), 3-aminopropyltrimethoxysilane, N-β-(aminoethyl)-γ-aminopropyltrimethoxysilane, bis[3-(trimethoxysilyl)propyl]amine, N,N'-bis[3-(trimethoxysilyl)propyl]ethane-1,2-diamine, and tetramethylguanidylpropyltrimethoxysilane because of more reactivity. From the standpoint of effective cure of the composition, more preference is given to dioctyltin dilaurate, dioctyltin diversatate, 3-aminopropyltrimethoxysilane, and tetramethylguanidylpropyltrimethoxysilane. From the standpoint that the composition is free of organotin compounds and less toxic, 3-aminopropyltrimethoxysilane and tetramethylguanidylpropyltrimethoxysilane are especially preferred. From the standpoint of effective cure of the composition, tetramethylguanidylpropyltrimethoxysilane is most preferred.

Although the amount of the curing catalyst (B) added is not particularly limited, the amount is preferably 0.01 to 15 parts by weight, more preferably 0.1 to 5 parts by weight per 100 parts by weight of component (A) because it is desirable to adjust the curing rate to an appropriate range for efficient working.

The inventive composition may further comprise a solvent.

The solvent used herein is not particularly limited as long as component (A) is dissolvable therein. Examples of the solvent include hydrocarbon solvents such as pentane, hexane, heptane, octane, decane, and cyclohexane; aromatic solvents such as benzene, toluene, and xylene; amide solvents such as formamide, N,N-dimethylformamide, pyrrolidone, and N-methylpyrrolidone; ester solvents such as ethyl acetate, butyl acetate, γ-butyrolactone, and propylene glycol-1-monomethyl ether-2-acetate; ketone solvents such as acetone, methyl ethyl ketone, and methyl isobutyl ketone; and ether solvents such as diethyl ether, dibutyl ether, cyclopentyl methyl ether, tetrahydrofuran, and 1,4-dioxane, which may be used alone or in admixture.

Of these, aromatic solvents such as toluene and xylene are preferred from the standpoints of solubility and volatility.

The amount of the solvent added is preferably 10 to 20,000 parts by weight, more preferably 100 to 10,000 parts by weight per 100 parts by weight of component (A).

It is noted that various bases and additives such as base polymers, adhesion improvers, inorganic and organic UV absorbers, storage stability improvers, plasticizers, fillers, pigments and flavors may be added to the inventive composition depending on a particular application.

A coated solid substrate may be obtained by coating the coating composition of the invention described above on the surface of a solid substrate and curing the composition to form a coating layer. Also, a bonded laminate may be obtained by coating the adhesive composition of the invention on the surface of a solid substrate, laying another solid substrate thereon, and curing the composition to form a bond layer.

The technique of coating each composition is not particularly limited. The coating technique may be selected as appropriate from well-known techniques such as spray coating, spin coating, dip coating, roller coating, brush coating, bar coating, and flow coating.

The solid substrate is not particularly limited. Examples include organic resin substrates such as epoxy resins, phenolic resins, polyimide resins, polycarbonate resins such as polycarbonates and polycarbonate blends, acrylic resins such as poly(methyl methacrylate), polyester resins such as poly(ethylene terephthalate), poly(butylene terephthalate), and unsaturated polyester resins, polyamide resins, acrylonitrile-styrene copolymer resins, styrene-acrylonitrile-butadiene copolymer resins, polyvinyl chloride resins, polystyrene resins, blends of polystyrene and polyphenylene ether, cellulose acetate butyrate, and polyethylene resins; metal substrates such as iron, copper and steel plates; paint-coated surfaces; glass; ceramics; concrete; slates; textiles; inorganic fillers such as wood, stone, tiles, (hollow) silica, titania, zirconia, and alumina; and fiber glass parts such as glass fibers, glass clothes, glass tape, glass mat, and glass paper. The material and shape of the substrate are not particularly limited.

The inventive composition is such that upon contact with moisture in the atmosphere, hydrolytic condensation reaction of the polymer having a reactive silicon-containing group (A) or dealcoholization reaction of the polymer (A) with silanol groups takes place. As the index of moisture in the atmosphere, any humidity in the range of RH 10% to 100% is acceptable. Since faster hydrolysis takes place at a higher humidity, moisture may be added to the atmosphere if desired.

The temperature and time of curing reaction may vary over a range depending on various factors such as a particular substrate, moisture concentration, catalyst concentration, and the type of hydrolyzable group. The curing reaction temperature is preferably normal temperature around 25° C. from the standpoint of working. To promote curing reaction, the coating may be cured by heating within the range below which the substrate is heat resistant. The curing reaction time is typically about 1 minute to about 1 week from the standpoint of working efficiency.

The inventive composition cures effectively even at normal temperature. Particularly when room temperature cure is essential for in-situ application or the like, the composition is good in cure and working because the coating surface becomes tack-free within several minutes to several hours. Nevertheless, heat treatment within the range below which the substrate is heat resistant is acceptable.

EXAMPLES

Examples and Comparative Examples are given below for further illustrating the invention although the invention is not limited thereto.

It is noted that the viscosity is measured at 25° C. by a Brookfield rotational viscometer, the molecular weight and degree of polymerization (m) are a number average molecular weight (Mn) and a number average degree of polymerization as determined by gel permeation chromatography (GPC) versus polystyrene standards.

Also, the number of monoalkoxysilyl groups introduced per polymer molecule is computed from analysis by $^1$H-NMR spectroscopy and the Mn as determined by GPC analysis.

[1] Synthesis of Polymer Having Reactive Silicon-Containing Group

[Example 1-1] Synthesis of Polymer 1

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii) below, and 3.6 g (functionality equivalent of methacryloyl group=0.019 mole) of methacryloyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by $^1$H-NMR analysis that the peaks assigned to methacryloyl group on the reactant disappeared completely, which was regarded the end of reaction.

The reaction product had a Mn of 10,900 and the number of monoalkoxysilyl groups introduced per polymer molecule was 2.1.

[Chem. 13]

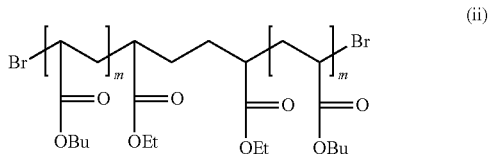

(ii)

[Example 1-2] Synthesis of Polymer 2

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,400 and a degree of polymerization (m) of 40, represented by average structural formula (iii) below, and 3.6 g (functionality equivalent of methacryloyl group=0.019 mole) of methacryloyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by $^1$H-NMR analysis that the peaks assigned to methacryloyl group on the reactant disappeared completely, which was regarded the end of reaction.

The reaction product had a Mn of 10,800 and the number of monoalkoxysilyl groups introduced per polymer molecule was 2.2.

[Chem. 14]

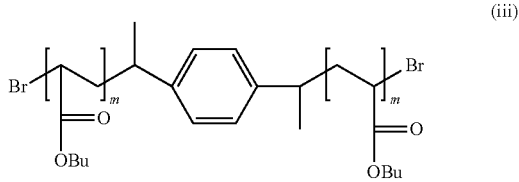

(iii)

[Example 1-3] Synthesis of Polymer 3

A 200-mL separable flask equipped with a stirrer, reflux condenser and thermometer was charged with 100 g (functionality equivalent of terminal leaving group (Br)=0.013 mole) of a leaving group-bearing polyacrylate compound having a Mn of 15,600 and a degree of polymerization (m) of 60, represented by average structural formula (ii), and 2.4 g (functionality equivalent of methacryloyl group=0.013 mole) of methacryloyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by $^1$H-NMR analysis that the peaks assigned to methacryloyl group on the reactant disappeared completely, which was regarded the end of reaction.

The reaction product had a Mn of 16,100 and the number of monoalkoxysilyl groups introduced per polymer molecule was 2.0.

[Example 1-4] Synthesis of Polymer 4

A 200-mL separable flask equipped with a stirrer, reflux condenser and thermometer was charged with 100 g (functionality equivalent of terminal leaving group (Br)=0.010 mole) of a leaving group-bearing polyacrylate compound having a Mn of 20,700 and a degree of polymerization (m) of 80, represented by average structural formula (ii), and 1.8 g (functionality equivalent of methacryloyl group=0.010 mole) of methacryloyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by 41-NMR analysis that the peaks assigned to methacryloyl group on the reactant disappeared completely, which was regarded the end of reaction.

The reaction product had a Mn of 21,100 and the number of monoalkoxysilyl groups introduced per polymer molecule was 2.1.

[Example 1-5] Synthesis of Polymer 5

A 200-mL separable flask equipped with a stirrer, reflux condenser and thermometer was charged with 100 g (functionality equivalent of terminal leaving group (Br)=0.008 mole) of a leaving group-bearing polyacrylate compound having a Mn of 25,800 and a degree of polymerization (m) of 100, represented by average structural formula (ii), and 1.5 g (functionality equivalent of methacryloyl group=0.008 mole) of methacryloyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by 41-NMR analysis that the peaks assigned to methacryloyl group on the reactant disappeared completely, which was regarded the end of reaction.

The reaction product had a Mn of 26,400 and the number of monoalkoxysilyl groups introduced per polymer molecule was 2.0.

[Example 1-6] Synthesis of Polymer 6

A 200-mL separable flask equipped with a stirrer, reflux condenser and thermometer was charged with 100 g (functionality equivalent of terminal leaving group (Br)=0.038 mole) of a leaving group-bearing polyacrylate compound having a Mn of 5,300 and a degree of polymerization (m) of 20, represented by average structural formula (ii), and 7.1 g (functionality equivalent of methacryloyl group=0.038 mole) of methacryloyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by 41-NMR analysis that the peaks assigned to methacryloyl group on the reactant disappeared completely, which was regarded the end of reaction.

The reaction product had a Mn of 5,700 and the number of monoalkoxysilyl groups introduced per polymer molecule was 2.2.

[Example 1-7] Synthesis of Polymer 7

A 200-mL separable flask equipped with a stirrer, reflux condenser and thermometer was charged with 100 g (functionality equivalent of terminal leaving group (Br)=0.072 mole) of a leaving group-bearing polyacrylate compound having a Mn of 2,800 and a degree of polymerization (m) of 10, represented by average structural formula (ii), and 13.6 g (functionality equivalent of methacryloyl group=0.072 mole) of methacryloyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by $^1$H-NMR analysis that the peaks assigned to methacryloyl group on the reactant disappeared completely, which was regarded the end of reaction.

The reaction product had a Mn of 3,200 and the number of monoalkoxysilyl groups introduced per polymer molecule was 2.3.

[Example 1-8] Synthesis of Polymer 8

A 200-mL separable flask equipped with a stirrer, reflux condenser and thermometer was charged with 100 g (functionality equivalent of terminal leaving group (Br)=0.135 mole) of a leaving group-bearing polyacrylate compound having a Mn of 1,500 and a degree of polymerization (m) of 5, represented by average structural formula (ii), and 25.4 g (functionality equivalent of methacryloyl group=0.135 mole) of methacryloyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by $^1$H-NMR analysis that the peaks assigned to methacryloyl group on the reactant disappeared completely, which was regarded the end of reaction.

The reaction product had a Mn of 2,000 and the number of monoalkoxysilyl groups introduced per polymer molecule was 2.1.

[Example 1-9] Synthesis of Polymer 9

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 3.3 g (functionality equivalent of acryloyl group=0.019 mole) of acryloyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by $^1$H-NMR analysis that the peaks assigned to acryloyl group on the reactant disappeared completely, which was regarded the end of reaction.

The reaction product had a Mn of 10,800 and the number of monoalkoxysilyl groups introduced per polymer molecule was 2.0.

[Example 1-10] Synthesis of Polymer 10

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 2.5 g (functionality equivalent of allyl group=0.019 mole) of allyloxymethyldimethylmethoxysilane, which were heated at 80° C. To the flask, 0.1 g of 2,2'-azobis-2-methylbutyronitrile was added, followed by stirring at 80° C. for 6 hours. It was confirmed by $^1$H-NMR analysis that the peaks assigned to allyl group on the reactant disappeared completely, which was regarded the end of reaction.

The reaction product had a Mn of 10,700 and the number of monoalkoxysilyl groups introduced per polymer molecule was 2.0.

[Example 1-11] Synthesis of Polymer 11

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 2.6 g (functionality equivalent of mercapto group=0.019 mole) of mercaptomethyldimethylmethoxysilane, which were heated at 80° C. To the flask, 2.2 g of potassium tert-butoxide was added, followed by stirring at 80° C. for 6 hours. It was confirmed by $^1$H-NMR analysis that the peaks assigned to mercapto group on the reactant disappeared completely, which was regarded the end of reaction. Thereafter, the salt formed with the progress of reaction and the excess of basic compound were removed by pressure filtration.

The reaction product had a Mn of 10,900 and the number of monoalkoxysilyl groups introduced per polymer molecule was 1.9.

[Example 1-12] Synthesis of Polymer 12

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 3.4 g (functionality equivalent of amino group=0.019 mole) of N-butylaminomethyldimethylmethoxysilane, which were stirred at 80° C. for 6 hours. It was confirmed by 41-NMR analysis that the peaks assigned to amino group on the reactant disappeared completely, which was regarded the end of reaction. To the flask, 2.2 g of potassium tert-butoxide was added, followed by stirring at 25° C. for 1 hour. Thereafter, the salt formed with the progress of reaction and the excess of basic compound were removed by pressure filtration.

The reaction product had a Mn of 11,000 and the number of monoalkoxysilyl groups introduced per polymer molecule was 2.2.

[Example 1-13] Synthesis of Polymer 13

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 4.4 g (functionality equivalent of amino group=0.019 mole) of N-octylaminomethyldimethylmethoxysilane, which were stirred at 80° C. for 6 hours. It was confirmed by 41-NMR analysis that the peaks assigned to amino group on the reactant disappeared completely, which was regarded the end of reaction. To the flask, 2.2 g of potassium tert-butoxide was added, followed by stirring at 25° C. for 1 hour. Thereafter, the salt formed with the progress of reaction and the excess of basic compound were removed by pressure filtration.

The reaction product had a Mn of 11,000 and the number of monoalkoxysilyl groups introduced per polymer molecule was 2.0.

[Example 1-14] Synthesis of Polymer 14

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 3.7 g (functionality equivalent of amino group=0.019 mole) of N-phenylaminomethyldimethylmethoxysilane, which were stirred at 80° C. for 6 hours. It was confirmed by $^1$H-NMR analysis that the peaks assigned to amino group on the reactant disappeared completely, which was regarded the end of reaction. To the flask, 2.2 g of potassium tert-butoxide was added, followed by stirring at 25° C. for 1 hour. Thereafter, the salt formed with the progress of reaction and the excess of basic compound were removed by pressure filtration.

The reaction product had a Mn of 10,800 and the number of monoalkoxysilyl groups introduced per polymer molecule was 2.1.

[Example 1-15] Synthesis of Polymer 15

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 3.6 g (functionality equivalent of amino group=0.019 mole) of N-(dimethylmethoxysilyl)piperazine, which were stirred at 80° C. for 6 hours. It was confirmed by $^1$H-NMR analysis that the peaks assigned to amino group on the reactant disappeared completely, which was regarded the end of reaction. To the flask, 2.2 g of potassium tert-butoxide was added, followed by stirring at 25° C. for 1 hour. Thereafter, the salt formed with the progress of reaction and the excess of basic compound were removed by pressure filtration.

The reaction product had a Mn of 10,900 and the number of monoalkoxysilyl groups introduced per polymer molecule was 2.0.

[Comparative Example 1-1] Synthesis of Polymer 16

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 4.1 g (functionality equivalent of methacryloyl group=0.019 mole) of 3-methacryloyloxypropyldimethylmethoxysilane, which were heated at 80° C. To the flask, 0.1 g of 2,2'-azobis-2-methylbutyronitrile was added, followed by stirring at 80° C. for 6 hours. It was confirmed by $^1$H-NMR analysis that the peaks assigned to methacryloyl group on the reactant disappeared completely, which was regarded the end of reaction.

The reaction product had a Mn of 11,000 and the number of monoalkoxysilyl groups introduced per polymer molecule was 2.1.

[Comparative Example 1-2] Synthesis of Polymer 17

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 4.8 g (functionality equivalent of methacryloyl group=0.019 mole) of 3-methacryloyloxypropyltrimethoxysilane, which were heated at 80° C. To the flask, 0.1 g of 2,2'-azobis-2-methylbutyronitrile was added, followed by stirring at 80° C. for 6 hours. It was confirmed by $^1$H-NMR analysis that the peaks assigned to methacryloyl group on the reactant disappeared completely, which was regarded the end of reaction.

The reaction product had a Mn of 11,100 and the number of monoalkoxysilyl groups introduced per polymer molecule was 2.1.

[Comparative Example 1-3] Synthesis of Polymer 18

A 200-mL separable flask equipped with a stirrer, reflux condenser and thermometer was charged with 100 g (functionality equivalent of terminal leaving group (Br)=0.019 mole) of a leaving group-bearing polyacrylate compound having a Mn of 10,450 and a degree of polymerization (m) of 40, represented by average structural formula (ii), and 3.4 g (functionality equivalent of amino group=0.019 mole) of 3-aminopropyltrimethoxysilane, which were stirred at 80° C. for 6 hours. The reaction solution gelled, failing to obtain any reaction product.

[2] Confirmation of Reactivity of Alkoxysilyl Group

Example 2-1

A composition was prepared on a moisture-blocked agitator by mixing 70 parts by weight of α,ω-dihydroxydimethylpolysiloxane having a viscosity of 5,000 mPa·s, 30 parts by weight of Polymer 1 obtained in Example 1-1, 100 parts by weight of toluene as solvent, and 0.5 part by weight of tetramethylguanidylpropyltrimethoxysilane as curing catalyst until uniform.

Examples 2-2 to 2-15 and Comparative Examples 2-1 to 2-2

Compositions were prepared as in Example 2-1 aside from using Polymers 2 to 15 obtained in Examples 1-2 to 1-15 or Polymers 16 to 17 obtained in Comparative Examples 1-1 to 1-2 instead of Polymer 1 in Example 2-1.

Comparative Example 2-3

A composition was prepared as in Example 2-1 aside from omitting Polymer 1 in Example 2-1.

The compositions prepared in Examples 2-1 to 2-15 and Comparative Examples 2-1 to 2-3 were evaluated as follows, with the results shown in Tables 1 and 2.

[Viscosity Rise]

A nitrogen gas-purged glass vial was charged with the composition obtained from the above preparation method, which was stored in plugged state in air at 25° C. and 50% RH. After a lapse of a predetermined time, a percent viscosity rise was computed as [(viscosity after the predetermined time)/(viscosity immediately after charging)]×100. A larger value indicates that alkoxysilyl groups are more reactive.

TABLE 1

| | | Example | | | | | | | | |
|---|---|---|---|---|---|---|---|---|---|---|
| | | 2-1 | 2-2 | 2-3 | 2-4 | 2-5 | 2-6 | 2-7 | 2-8 | 2-9 |
| Polymer | | 1 | 2 | 3 | 4 | 5 | 6 | 7 | 8 | 9 |
| Viscosity | After 24 hr | 380 | 350 | 300 | 290 | 250 | 370 | 380 | 380 | 360 |
| rise, % | After 100 hr | 1200 | 1080 | 920 | 900 | 870 | 1100 | 1100 | 1200 | 1100 |

TABLE 2

|  |  | Example | | | | | | Comparative Example | | |
| --- | --- | --- | --- | --- | --- | --- | --- | --- | --- | --- |
|  |  | 2-10 | 2-11 | 2-12 | 2-13 | 2-14 | 2-15 | 2-1 | 2-2 | 2-3 |
| Polymer |  | 10 | 11 | 12 | 13 | 14 | 15 | 16 | 17 | — |
| Viscosity | After 24 hr | 350 | 380 | 360 | 360 | 350 | 380 | 100 | gelled | 100 |
| rise, % | After 100 hr | 900 | 1200 | 1100 | 1000 | 900 | 1200 | 105 |  | 102 |

As seen from Tables 1 and 2, the compositions prepared in Examples 2-1 to 2-15 using Polymers 1 to 15 obtained in Examples 1-1 to 1-15 show higher viscosity rises than the compositions prepared in Comparative Examples 2-1 and 2-3, indicating alkoxysilyl groups having better reactivity.

In contrast, the compositions of Comparative Examples 2-1 and 2-3 show little viscosity rises, indicating a failure to provide sufficient reactivity. The composition of Comparative Example 2-2 gelled after a lapse of the predetermined time because of an excessive increase of crosslinking density. All these compositions are unsuitable for the purpose of the invention.

[3] Preparation of Composition and Cured Film

Example 3-1

A composition was prepared by mixing 70 parts by weight of silicone based coating agent KR-400 (Shin-Etsu Chemical Co., Ltd.), 30 parts by weight of Polymer 1 obtained in Example 1-1, and 100 parts by weight of toluene as solvent on a moisture-blocked agitator until uniform.

The composition was applied to a cold-finished steel plate by bar coater No. 5 in air at 25° C. and 50% RH and dried and cured in air at 25° C. and 50% RH for 7 days, obtaining a cured film.

Examples 3-2 to 3-15 and Comparative Examples 3-1 to 3-2

Compositions and cured films were prepared as in Example 3-1 aside from using Polymers 2 to 15 obtained in Examples 1-2 to 1-15 or Polymers 16 to 17 obtained in Comparative Examples 1-1 to 1-2 instead of Polymer 1 in Example 3-1.

Comparative Example 3-3

A composition and cured film were prepared as in Example 3-1 aside from omitting Polymer 1 in Example 3-1.

The cured films obtained in Examples 3-1 to 3-15 and Comparative Examples 3-1 to 3-3 were evaluated as follows, with the results shown in Tables 3 and 4.

[Flexibility]

A test piece in the form of a cold-finished steel plate having a cured film formed thereon by the above coating method was tested by using a mandrel flexing tester prescribed in JIS K5600-5-1, and bending the test piece on a cylindrical mandrel having a diameter of 8 mm. It was visually observed whether or not the cured film cracked (or crazed) and peeled at the surface as a result of flexural deformation. The test piece was evaluated good (◯), that is, the cured film was fully flexible, when neither cracking nor peeling was observed, and poor (X) when cracking and/or peeling was observed.

TABLE 3

|  | Example | | | | | | | | |
| --- | --- | --- | --- | --- | --- | --- | --- | --- | --- |
|  | 3-1 | 3-2 | 3-3 | 3-4 | 3-5 | 3-6 | 3-7 | 3-8 | 3-9 |
| Polymer | 1 | 2 | 3 | 4 | 5 | 6 | 7 | 8 | 9 |
| Flexibility | ◯ | ◯ | ◯ | ◯ | ◯ | ◯ | ◯ | ◯ | ◯ |

TABLE 4

|  | Example | | | | | | Comparative Example | | |
| --- | --- | --- | --- | --- | --- | --- | --- | --- | --- |
|  | 3-10 | 3-11 | 3-12 | 3-13 | 3-14 | 3-15 | 3-1 | 3-2 | 3-3 |
| Polymer | 10 | 11 | 12 | 13 | 14 | 15 | 16 | 17 | — |
| Flexibility | ◯ | ◯ | ◯ | ◯ | ◯ | ◯ | uncured | X | X |

As seen from Tables 3 and 4, the compositions prepared in Examples 3-1 to 3-15 using Polymers 1 to 15 obtained in Examples 1-1 to 1-15 are more curable than the composition prepared in Comparative Example 3-1, indicating alkoxysilyl groups having better reactivity. Also the compositions using the inventive polymers show higher flexibility than the compositions prepared in Comparative Examples 3-2 and 3-3.

In contrast, the composition prepared in Comparative Example 3-1 forms a coating which remains tacky or sticky even after a lapse of the predetermined time, indicating a failure to provide sufficient reactivity. The compositions of Comparative Examples 3-2 and 3-3 failed to keep the cured film flexible because of an excessive increase of crosslinking density.

It has been demonstrated that the inventive polymers having a reactive silicon-containing group contain mono-alkoxysilyl groups and yet have high reactivity, and cured films having improved flexibility are obtained therefrom.

Due to such properties, the inventive compounds are advantageously used in the applications of coating agents, adhesives, and sealants.

The invention claimed is:

1. A method for preparing a polymer having a reactive silicon-containing group, comprising:
reacting a poly(meth)acrylate compound having the average structural formula (4):

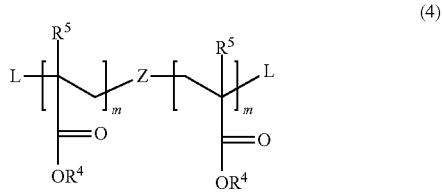

(4)

wherein
R⁴ is a substituted or unsubstituted $C_1$-$C_{10}$ alkyl group, or substituted or unsubstituted $C_6$-$C_{10}$ aryl group,
R⁵ is hydrogen or methyl,
Z is a single bond, substituted or unsubstituted $C_1$-$C_{20}$ alkylene group, substituted or unsubstituted $C_7$-$C_{20}$ aralkylene group, or substituted or unsubstituted $C_6$-$C_{20}$ arylene group,
m is each independently a number of at least 1, and
L is a leaving group selected from among chlorine, bromine, iodine, methansulfonate, trifluoromethanesulfonate, and p-toluenesulfonate,
with a compound having the formula (5):

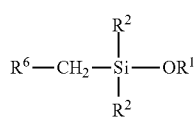

(5)

wherein R¹ and R² are as defined above,
R⁶ is a group containing a functional group capable of reacting with the leaving group;
wherein the polymer having the reactive silicon-containing group is represented by the structural formula (1):

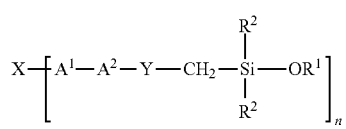

(1)

wherein R¹ is a substituted or unsubstituted $C_1$-$C_{10}$ alkyl group or substituted or unsubstituted $C_6$-$C_{10}$ aryl group,
R² is each independently a substituted or unsubstituted $C_1$-$C_{10}$ alkyl group or substituted or unsubstituted $C_6$-$C_{10}$ aryl group,
n indicative of the valence of X is a number of 1 to 3,
X is a mono- to trivalent organic group having a backbone skeleton selected from among polyurethane, polyurea, polycarbonate, polyester, polyamide, polyimide, polyamide-imide, poly(meth)acrylate, polystyrene, polyolefin, polyvinyl ester, polytetrafluoroethylene, polyacetal, polyphenylene ether, polyphenylene sulfide, polysulfone, polyether sulfone, polyether ether ketone, polysiloxane, polysiloxane-polyurethane copolymers and polysiloxane-polyurea copolymers, and copolymers thereof,
Y is a single bond, O, S, or N(R³),
R³ is hydrogen, a substituted or unsubstituted $C_1$-$C_{10}$ alkyl group, or substituted or unsubstituted $C_6$-$C_{10}$ aryl group, and when X is di- or trivalent, R³ in two groups N(R³) may bond together to form a substituted or unsubstituted $C_1$-$C_{10}$ alkylene group or substituted or unsubstituted $C_6$-$C_2M$ arylene group, and
A¹ and A² are each independently a single bond, a substituted or unsubstituted $C_1$-$C_{20}$ divalent hydrocarbon group, or a divalent linking group containing a heteroatom,
with the proviso that when Y is a single bond, divalent group A¹-A² or X bonds to the Si-bonded $CH_2$ group (excluding $CH_2$ in R²) via a heteroatom.

2. The method of claim 1, wherein in the polymer having the reactive silicon-containing group, X is a divalent organic group having a backbone skeleton selected from among polyurethane, poly(meth)acrylate, polysiloxane, and polysiloxane-polyurethane copolymers.

3. The method of claim 1, wherein the polymer having the reactive silicon-containing group is represented by structural formula (2):

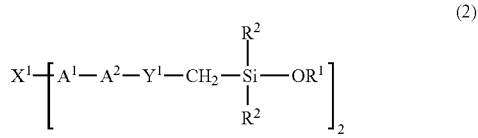

(2)

wherein R¹, R², A¹ and A² are as defined above, X¹ is a divalent organic group having a poly(meth)acrylate structure, Y¹ is O, S or N(R³), and R³ is as defined above.

4. The method of claim 1, wherein the polymer having the reactive silicon-containing group is represented by structural formula (3):

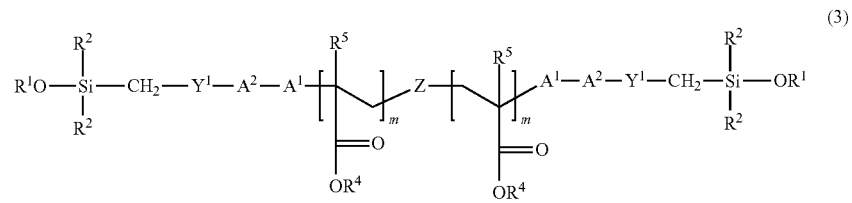

(3)

wherein $R^1$, $R^2$, $A^1$ and $A^2$ are as defined above, $Y^1$ is O, S or $N(R^3)$, $R^4$ is a substituted or unsubstituted $C_1$-$C_{10}$ alkyl group, or substituted or unsubstituted $C_6$-$C_{10}$ aryl group, $R^5$ is hydrogen or methyl, Z is a single bond, substituted or unsubstituted $C_1$-$C_{20}$ alkylene group, substituted or unsubstituted $C_7$-$C_{20}$ aralkylene group, or substituted or unsubstituted $C_6$-$C_{20}$ arylene group, and m is each independently a number of at least 1.

5. The method of claim 1, wherein $R^6$ is a group containing a (meth)acryloyloxy, alkenyloxy, mercapto or amino group.

* * * * *